US012654272B2

(12) United States Patent
Ishikawa et al.

(10) Patent No.: US 12,654,272 B2
(45) Date of Patent: Jun. 16, 2026

(54) COOLING MEDIUM SPRAY DEVICE

(71) Applicant: NT TOOL CORPORATION,
Takahama-City (JP)

(72) Inventors: Hitoshi Ishikawa, Takahama-City (JP);
Hiroyuki Suzuki, Kariya (JP)

(73) Assignee: NT TOOL CORPORATION,
Takahama-City (JP)

( * ) Notice: Subject to any disclaimer, the term of this
patent is extended or adjusted under 35
U.S.C. 154(b) by 184 days.

(21) Appl. No.: 18/683,390

(22) PCT Filed: Mar. 8, 2022

(86) PCT No.: PCT/JP2022/010077
§ 371 (c)(1),
(2) Date: Feb. 13, 2024

(87) PCT Pub. No.: WO2023/021753
PCT Pub. Date: Feb. 23, 2023

(65) Prior Publication Data
US 2025/0135592 A1     May 1, 2025

(30) Foreign Application Priority Data

Aug. 16, 2021    (JP) ................................. 2021-132476

(51) Int. Cl.
*B23Q 11/00*        (2006.01)
*B23Q 11/10*        (2006.01)
(52) U.S. Cl.
CPC ...... *B23Q 11/0075* (2013.01); *B23Q 11/1015*
(2013.01); *B23Q 2230/002* (2013.01)
(58) Field of Classification Search
CPC ... B23Q 11/075; B23Q 11/10; B23Q 11/1015;
B23Q 11/1023; B23Q 11/103;
(Continued)

(56) References Cited

U.S. PATENT DOCUMENTS

| | | | |
|---|---|---|---|
| 3,781,024 A | 12/1973 | Ganser et al. | |
| 4,534,803 A | 8/1985 | Asano et al. | |

(Continued)

FOREIGN PATENT DOCUMENTS

| | | | |
|---|---|---|---|
| CN | 104080576 A | 10/2014 | |
| CN | 205043547 U | 2/2016 | |

(Continued)

OTHER PUBLICATIONS

Office Action from the Taiwanese Patent Office dispatched Oct. 1,
2025 in related Taiwanese application No. 111109397, and transla-
tion thereof.

(Continued)

*Primary Examiner* — Darren W Gorman
(74) *Attorney, Agent, or Firm* — J-TEK LAW PLLC;
Jeffrey D. Tekanic; Scott T. Wakeman

(57)     ABSTRACT

Cooling medium from a main shaft (20) of a machine tool
(10) is pressurized by a pump (300) and led to a nozzle (242)
via a second case passage (222). A relief valve (500) is also
connected to the second case passage and discharges cooling
medium from an outlet port (511*b*) when the cooling
medium pressure within the second case passage exceeds a
pressure set value (Ts). At a prescribed rotational speed (Ns),
the pump discharges cooling medium, at a prescribed pres-
sure (Tr) that is higher than the pressure set value (Ts), from
an outlet port (302) of the pump. The cross-sectional area
(S2) of an outlet port (511*b*) of the relief valve is smaller
than the cross-sectional area (S1) of an inlet port (511*a*)
thereof. Therefore, at the prescribed rotational speed, a
change of the discharge state of the cooling medium from
the outlet port (511*b*) is visually observable.

18 Claims, 8 Drawing Sheets

A ⟨⟶⟩ B

(58) Field of Classification Search
CPC ........... B23Q 11/1076; B23Q 11/1084; B23Q
2220/008; B23Q 2230/002; B05B 9/0416;
B05B 9/0426; B05B 12/087; B05B 15/65;
B23B 2231/24
See application file for complete search history.

(56) References Cited

U.S. PATENT DOCUMENTS

| | | | |
|---|---|---|---|
| 4,598,617 A | 7/1986 | Kubo et al. | |
| 4,652,189 A | 3/1987 | Mizoguchi | |
| 5,494,134 A | 2/1996 | Mcconkey | |
| 5,700,115 A * | 12/1997 | Chikamori | B23Q 5/048 |
| | | | 408/233 |
| 6,409,641 B1 | 6/2002 | Hashimoto | |
| 7,293,943 B1 | 11/2007 | Matsumura et al. | |
| 7,563,062 B1 | 7/2009 | Chen | |
| 2005/0134125 A1 | 6/2005 | Kim | |
| 2006/0196325 A1 | 9/2006 | Sakai | |
| 2007/0145075 A1 | 6/2007 | Divisi | |
| 2010/0270757 A1 | 10/2010 | Beckington | |
| 2013/0108380 A1 | 5/2013 | Lee | |
| 2014/0284041 A1 | 9/2014 | Kawano et al. | |
| 2017/0023926 A1 | 1/2017 | Kijima et al. | |
| 2017/0106485 A1 | 4/2017 | Kuyo et al. | |
| 2017/0355054 A1 | 12/2017 | Nakamaru | |
| 2020/0171610 A1 | 6/2020 | Otani et al. | |
| 2021/0220956 A1* | 7/2021 | Fang | B23C 5/109 |
| 2023/0173631 A1 | 6/2023 | Ishikawa et al. | |
| 2024/0351112 A1 | 10/2024 | Ishikawa et al. | |
| 2024/0367186 A1 | 11/2024 | Ishikawa et al. | |

FOREIGN PATENT DOCUMENTS

| | | | |
|---|---|---|---|
| CN | 106062394 A | 10/2016 | |
| CN | 107617752 A | 1/2018 | |
| CN | 108687566 A | 10/2018 | |
| CN | 113226636 A | 8/2021 | |
| EP | 0669187 A2 | 8/1995 | |
| EP | 2708311 B1 | 12/2015 | |
| EP | 3112713 A1 | 1/2017 | |
| JP | S5976749 A | 5/1984 | |
| JP | S59171050 U | 11/1984 | |
| JP | S6185339 U | 6/1986 | |
| JP | S624550 A | 1/1987 | |
| JP | H01222842 A | 9/1989 | |
| JP | H0392244 A | 4/1991 | |
| JP | H0482606 A | 3/1992 | |
| JP | H0557690 A | 3/1993 | |
| JP | 2003025183 A | 1/2003 | |
| JP | 2006167862 A | 6/2006 | |
| JP | 3961836 B2 * | 8/2007 | B23Q 11/10 |
| JP | 2008207290 A * | 9/2008 | B23Q 11/1023 |
| JP | 4933918 B2 * | 5/2012 | B23Q 11/1023 |
| JP | 2015020214 A | 2/2015 | |
| JP | 2015033731 A | 2/2015 | |
| JP | 2017074653 A | 4/2017 | |
| KR | 20140095631 A | 8/2014 | |
| TW | M333260 U | 6/2008 | |
| WO | 2017013738 A1 | 1/2017 | |
| WO | WO-2018136145 A1 * | 7/2018 | B23Q 11/0075 |
| WO | 2021229962 A1 | 11/2021 | |
| WO | 2023021754 A1 | 2/2023 | |
| WO | 2023026532 A1 | 3/2023 | |

OTHER PUBLICATIONS

Office Action from the Taiwanese Patent Office dispatched May 12, 2025 in related Taiwanese application No. 111109399, and machine translation thereof.

Office Action from the Taiwanese Patent Office dispatched May 29, 2025 in related Taiwanese application No. 111109397, and machine translation thereof.

Supplementary European Search Report from the European Patent Office dated Oct. 23, 2024, in related EP application No. 22 85 8078.3, including Search Opinion and Search Report.

English translation of the International Search Report dated Apr. 26, 2022, for application No. PCT/JP2022/010077.

English translation of the International Search Report dated Apr. 26, 2022, for application No. PCT/JP2022/010078.

English translation of the International Search Report dated Apr. 26, 2022, for application No. PCT/JP2022/010079.

English translation of the International Search Report dispatched Jul. 6, 2021, for application No. PCT/JP2021/014816.

English translation of the Written Opinion of the International Searching Authority in application No. PCT/JP2022/010077.

Extended European Search Report from the European Patent Office dispatched Aug. 21, 2023, in related EP application No. 21 80 5010, including European Search Opinion, Supplementary European Search Report and examined claims 1-3.

Unpublished U.S. Appl. No. 18/683,385, inventors: Ishikawa et al., International filing date: Mar. 8, 2022.

Unpublished U.S. Appl. No. 18/683,566, inventors: Ishikawa et al., International filing date: Mar. 8, 2022.

Extended European Search Report from the European Patent Office dispatched Oct. 29, 2024 in related application No. EP 22 86 0830, including European Search Opinion.

Office Action from the Japanese Patent Office dispatched Nov. 19, 2024 in related Japanese application No. 2021-137917, and machine translation thereof.

Office Action from the Taiwanese Patent Office dispatched Dec. 25, 2024 in related Taiwanese application No. 110116877, and machine translation thereof.

Office Action mailed Feb. 14, 2025, in related U.S. Appl. No. 17/924,164, examined claims 1-20, and Amendment and Response filed Apr. 22, 2025 in related U.S. Appl. No. 17/924,164.

Office Action mailed Apr. 2, 2026, in related U.S. Appl. No. 18/683,566, and examined claims 1-2 and 4-15.

Office Action and Search Report from the Chinese Patent Office dispatched Feb. 26, 2026, in counterpart CN application No. 202280054635.2, and machine translation thereof.

* cited by examiner

[Rotational speed - Discharge pressure]

COOLING MEDIUM SPRAY DEVICE

CROSS-REFERENCE

This application is the US national stage of International patent application no. PCT/JP2022/010077 filed on Mar. 8, 2022, which claims priority to Japanese patent application no. 2021-132476 filed on Aug. 16, 2021.

TECHNICAL FIELD

The present disclosure relates to a cooling medium spray device that sprays a cooling medium that is being supplied from a main shaft of a machine tool.

BACKGROUND ART

In a machine tool for cutting a metal workpiece, a tool holder that is mountable on a main shaft (which is called as a "spindle") of the machine tool is used. Furthermore, when machining a workpiece using a tool, it is necessary to supply a cooling medium such as an oil to a cutting edge of the tool for the purpose of lubrication between the workpiece and the tool, cooling of the workpiece or the tool, removal (cleaning) of chips (sometimes called "swarf" or "tendrils") generated by the machining operation, or the like. Therefore, a tool holder, which is provided with a cooling medium supply mechanism that sprays the cooling medium (which is called as a "coolant") that is being supplied from the main shaft of the machine tool to a cutting edge of the tool, is used. Furthermore, in order to be able to spray the cooling medium in a stable manner, as disclosed in Patent Document 1 (Japanese Unexamined Patent Application Publication No. S62-4550), a tool holder, which is provided with a cooling medium supply mechanism constituted by a pump that has a rotary part coupled to the main shaft, is used.

PRIOR ART PATENT DOCUMENT

Patent Document 1: Japanese Unexamined Patent Application Publication No. S62-4550

SUMMARY

Chips (e.g., tendrils) generated during machining of a workpiece cannot be sufficiently removed using a cooling medium sprayed from a cooling medium supply mechanism provided in a tool holder at the pressure of the cooling medium that is being supplied from a main shaft of a typical machine tool. In addition, burrs generated during machining of the workpiece also cannot be sufficiently removed.

Therefore, after having machined the workpiece, the operator performs an operation (removal operation) that removes chips and burrs remaining on the workpiece.

It might therefore be conceivable to increase removal effectiveness of chips and burrs by increasing the pressure of the cooling medium that is sprayed from the cooling medium supply mechanism provided in the tool holder.

In order to increase the pressure of the cooling medium that is sprayed from the cooling medium supply mechanism provided in the tool holder, it would be required to increase the pressure of the cooling medium that is being supplied from the main shaft of the machine tool.

However, in order to increase the pressure of the cooling medium that is being supplied from the main shaft of the machine tool, it is required to design the machine tool in a high pressure manner and is thus quite costly.

Further, it might also be conceivable to use a tool holder provided with a cooling medium supply mechanism constituted by a pump that has a rotary part coupled to a main shaft as disclosed in Patent Document 1. In this case, by increasing the rotational speed of the rotary part of the pump, the pressure of the cooling medium that is sprayed from the cooling medium supply mechanism could be increased.

However, the tool holder disclosed in Patent Document 1 is one that sprays the cooling medium to a cutting edge, etc. of a tool while machining a workpiece using the held tool. Therefore, there is a limit to increasing the rotational speed of the tool holder.

Furthermore, in the tool holder disclosed in Patent Document 1, the spray hole of the cooling medium supply mechanism rotates together with the main shaft. Therefore, the cooling medium sprayed from the spray hole is diffused by centrifugal force, and thus the cooling medium cannot be sprayed toward a prescribed location in a focused manner. That is, the cooling medium cannot be sprayed in a focused manner to a location where chips tend to remain unremoved or to a location where burrs tend to be generated.

It is accordingly one non-limiting object of the present disclosure to provide a cooling medium spray device that can increase the pressure of a cooling medium supplied from a main shaft of a machine tool and can spray the pressurized cooling medium toward a prescribed location in a focused manner.

In a first aspect of the present disclosure, a cooling medium spray device includes a body part, a support part, a pump, a cap, a nozzle and a pressure control device.

The body part is detachably attachable to a main shaft of a machine tool. Furthermore, the body part has a body part passage, through which the cooling medium supplied from the main shaft passes in a state in which the body part has been attached to the main shaft. Various methods can be used to attach the body part to the main shaft. For example, a pull stud can be attached to a rear end side of the body part and the pull stud can be pulled toward the main shaft (toward the rear end side).

The support part is formed in a tubular shape having a support part interior space in the interior. The body part is disposed in the support part interior space in a rotatable manner. Furthermore, the support part has a first passage and a second passage through which the cooling medium passes. The first passage fluidly communicates with the body part passage of the body part. Various methods can be used to enable the first passage to fluidly communicate with the body part passage.

The pump has a rotary part, an inlet part, and an outlet part. The rotary part of the pump is connected to the body part and is rotatably disposed in the support part interior space of the support part. The inlet part fluidly communicates with the first passage, and the outlet part fluidly communicates with the second passage. By rotating the rotary part, the pump increases the pressure of (pressurizes) the cooling medium suctioned from the inlet part to a pressure corresponding to the rotational speed of the rotary part and discharges pressurized cooling medium from the outlet part. A variety of configurations of pumps can be used as the pump. The rotary part of the pump may be rotated in conjunction with rotation of the body part, and it may be directly connected to the body part or connected via one or more other members.

The cap is disposed on one (a first) side (front end side) of the pump in an axial direction on the support part so as to close the support part interior space of the support part. Furthermore, the cap has a nozzle mounting hole in which the nozzle is mounted and a cap passage that fluidly communicates with the nozzle mounting hole. The cap is mounted on the support part such that the cap passage fluidly communicates with the second passage.

The nozzle is formed with a nozzle passage having a spray hole. The nozzle is mounted in the nozzle mounting hole of the cap such that the nozzle passage fluidly communicates with the nozzle mounting hole.

The pressure control device (pressure regulator) has a discharge passage and a valve element. The discharge passage has an inlet part (inlet port) on an inflow side that communicates with the second passage of the support part, and an outlet part (outlet port) on an outflow side. The inlet part has a valve seat. The valve element opens and closes the valve seat based on the pressure T of the cooling medium within the second passage (within the inlet part) and a pressure set value Ts. By opening and closing the valve element, the pressure T of the cooling medium within the second passage is prevented from exceeding the pressure set value Ts. The shapes of valve seat and the valve element can be selected from a variety of shapes that are capable of opening and closing the valve seat by moving the valve element. A variety of configurations of known pressure control devices can be used as the pressure control device.

The pump is configured such that it has characteristics in which, when the rotational speed of the rotary part is a prescribed rotational speed Ns, the pressure T of the cooling medium discharged from the outlet part becomes a prescribed pressure Tr (>Ts) that is higher than the pressure set value Ts of the pressure control device.

Furthermore, in the present embodiment, sectional area S2 of the outlet part is smaller than sectional area S1 of the inlet part (S2<S1). Furthermore, the pressure control device is configured such that, in a state in which the rotary part of the pump is rotating at the prescribed rotational speed Ns, a change of a discharge state of the cooling medium from the outlet part can be determined by visual observation. The expression "discharge state of the cooling medium from the outlet part" corresponds, for example, to the discharge amount, the discharge speed and the discharge trajectory of the cooling medium. The expression "a change of a discharge state of the cooling medium can be determined by visual observation" means, for example, that it can be determined by visual observation whether it is a normal discharge state or an abnormal discharge state (for example, a discharge state in which the performance of the pump has deteriorated, or a discharge state in which the spray hole of the nozzle has clogged).

The cooling medium supply device of the present disclosure can increase the pressure of the cooling medium supplied from the main shaft of the machine tool to a pressure capable of removing chips and burrs generated during machining of a workpiece, and can spray the pressurized cooling medium in a prescribed direction in a focused manner. Thus, by using the cooling medium spray device of the present disclosure, chips and burrs remaining on the workpiece after machining has been performed using a tool can be reliably removed at low cost with a simple structure.

In another aspect of the present disclosure, the pressure control device includes a first elastic force generating part that generates an elastic force. Furthermore, pressure control device is configured such that the elastic force generated by the first elastic force generating part acts as a force that moves (urges) the valve element in a direction of closing the valve seat and the pressure of the cooling medium within the second passage acts as a force that moves (urges) the valve element in a direction of opening the valve seat.

In this aspect, the pressure control device can be constituted at low cost.

In another aspect of the present disclosure, the pressure control device is configured such that the cooling medium is discharged in a horizontal direction from the outlet part. The expression "it is configured such that the cooling medium is discharged in a horizontal direction from the outlet part" includes "it is configured to be adjustable such that the cooling medium is discharged in a horizontal direction". The "horizontal direction" need not be a strictly horizontal direction. The description "discharging in a horizontal direction" includes "discharging obliquely downward relative to the horizontal direction".

In this aspect, a change of the discharge state of the cooling medium can be more easily determined.

In another aspect of the present disclosure, a rotation stopping device is provided.

The rotation stopping device includes a pin that is provided in the support part and is configured to be fitted into a fitting part provided in the machine tool. In addition, the rotation stopping device is configured such that, in the state in which the body part has been attached to the main shaft, the support part is prevented (blocked) from rotating around the body part when the pin is fitted (disposed) in the fitting part.

In this aspect, the rotary part of the pump can be easily rotated.

In another aspect of the present disclosure, the cooling medium spray device is configured such that the body part can be attached to the main shaft by moving the body part toward the other (a second) side (toward the rear end side) in the axial direction relative to the main shaft.

In addition, the rotation stopping device further includes a second elastic force generating part, an engagement part and an engaging member.

The pin is movable along the axial direction relative to the support part. The second elastic force generating part generates an elastic force that moves (urges) the pin relative to the support part toward the other (second) side (toward the rear end side) in the axial direction.

The engagement part is provided on the body part. The engaging member is movable in the axial direction in conjunction with the pin and is engageable with the engagement part.

In addition, in a state in which the body part is not attached to the main shaft, the pin moves (is urged) toward the other side (toward the rear end side) in the axial direction owing to the elastic force generated by the second elastic force generating part and the engaging member moves to an engagement position where it is engaged with the engagement part. Thereby, rotation of the body part relative to the support part is prevented. Furthermore, in the state in which the body part has been attached to the main shaft, the pin abuts on an abutment part provided in the machine tool and moves toward the one (second) side (toward the front end side) in the axial direction against the elastic force generated by the second elastic force generating part. At the same time, the engaging member moves to a disengagement position where engagement with the engagement part is released. Thereby, rotation of the body part relative to the support part becomes possible.

In this aspect, in the state in which the body part is not attached to the main shaft, the body part and the support part can be easily managed. Furthermore, in the state in which the body part has been attached to the main shaft, the body part and the rotary part of the pump connected to the body part can be easily rotated.

Thus, a cooling medium spray device of the present disclosure can increase the pressure of the cooling medium and then spray the pressurized cooling medium toward a prescribed location in a focused manner, so that it is possible to easily and reliably remove chips and burrs remaining on the machined workpiece.

DETAILED DESCRIPTION

The following detailed description merely teaches a person skilled in the art detailed information for practicing preferred exemplary embodiments of the present invention. The technical scope of the present invention is not limited by the detailed description and is to be determined based on the statements of the scopes of the claims. For this reason, combinations of configurations and methods in the following detailed description are not necessary to practice the invention in the broadest sense, and are limited to disclosing representative examples of the present invention in the detailed description, which has been given with reference numbers of the accompanying drawings.

In the following, an embodiment of a cooling medium spray device of the present disclosure will be described below with reference to the drawings.

It is noted that, hereinbelow, a direction along a center line P of a cooling medium spray device is called the "axial direction". Furthermore, the side on which a nozzle is disposed (the side which arrow B points in FIGS. 1 and 4) is called the "one (first) side in the axial direction", the "front end side" or the "front end side in the axial direction". In addition, the side opposite to the side on which the nozzle is disposed (the side on which a body member is disposed) (the side which arrow A points in FIGS. 1 and 4) is called the "other (second) side in the axial direction", the "rear end side" or the "rear end side in the axial direction". Of course, the "one side in the axial direction" and the "other side in the axial direction" may be reversed.

One representative embodiment of the cooling medium spray device according to the present disclosure will be described with reference to FIGS. 1 to 5.

Figure 1:
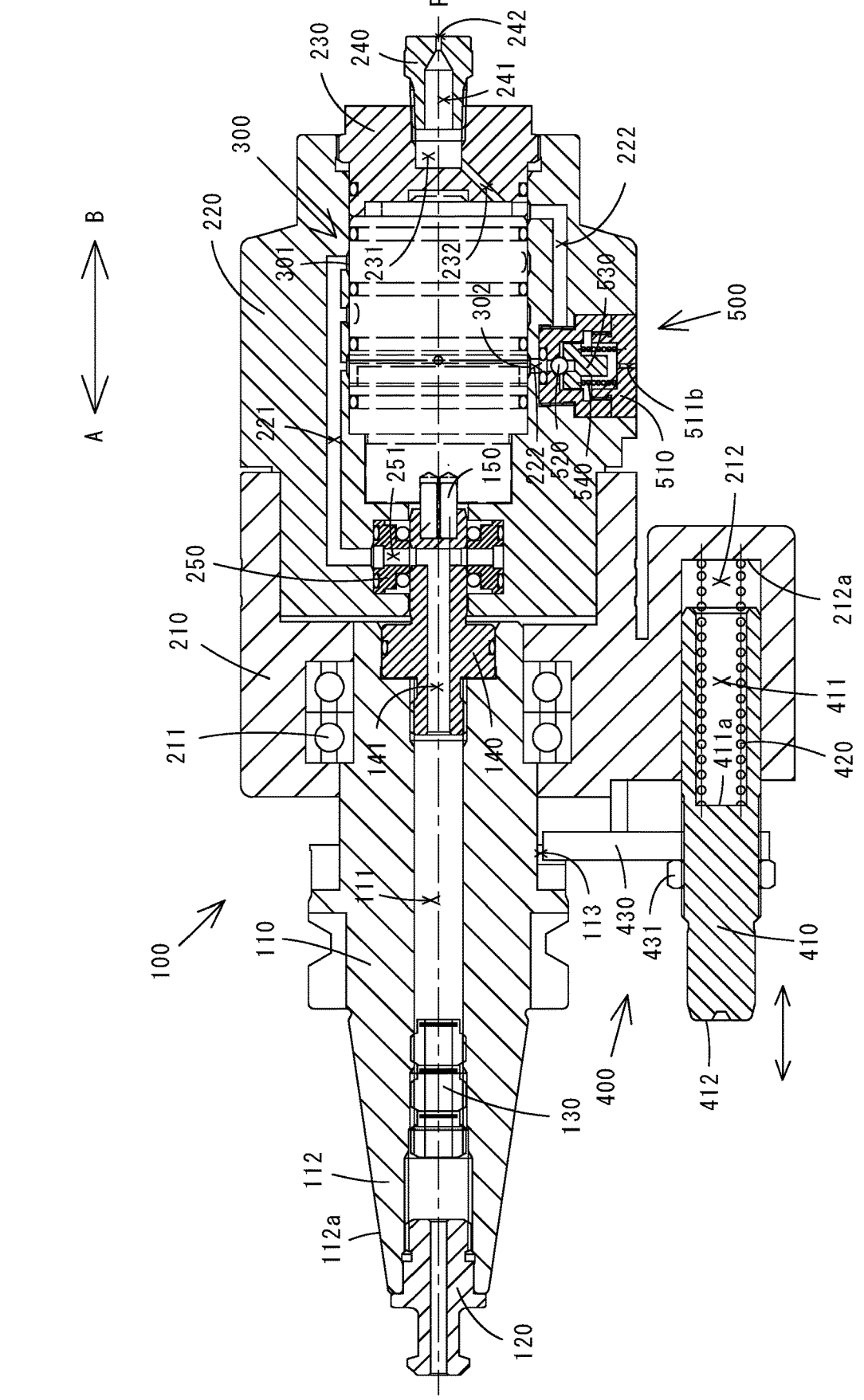
FIG. 1 is a sectional view of a cooling medium spray device according to one embodiment of the present disclosure.
Figure 2:
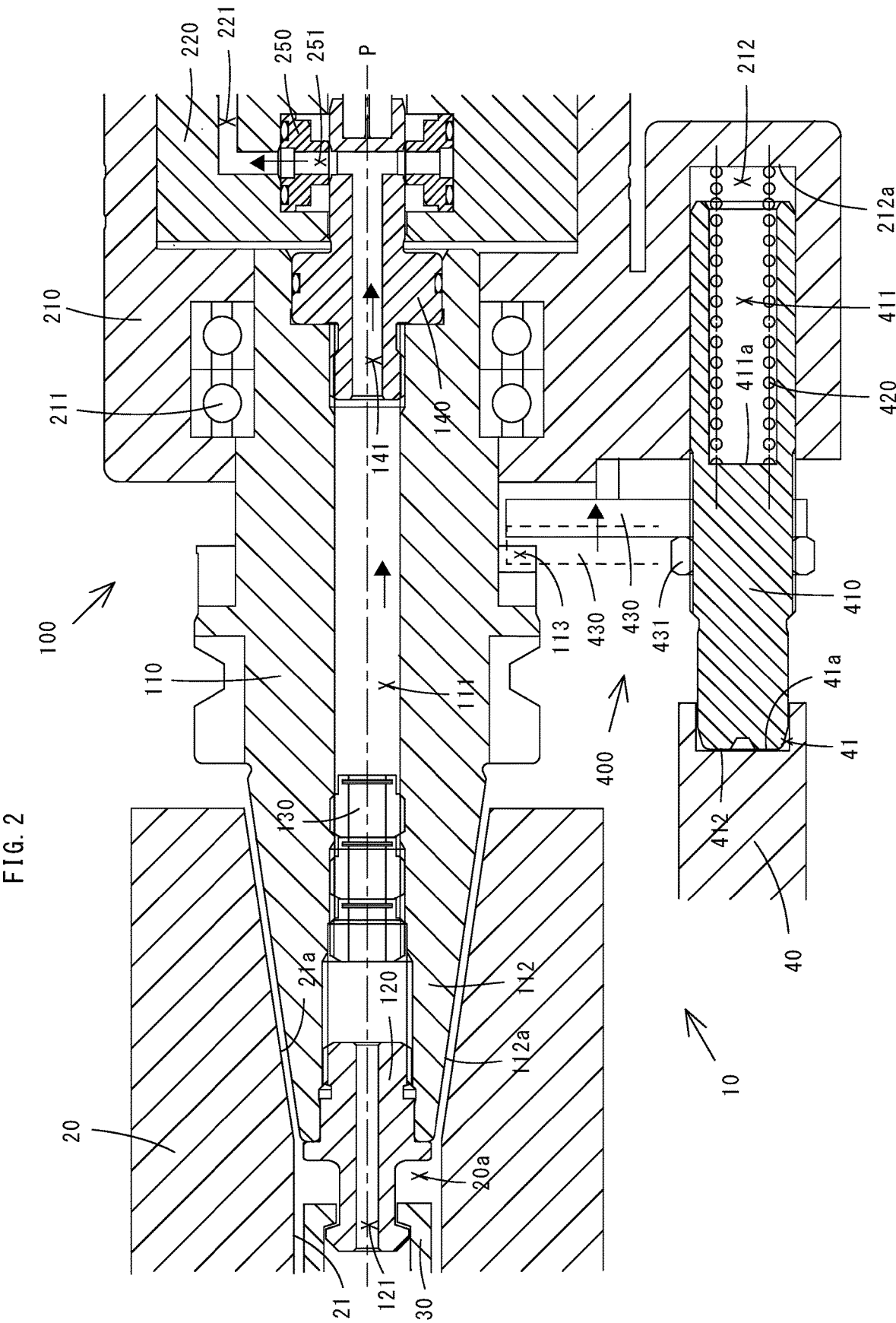
FIG. 2 illustrates an operation that attaches the cooling medium spray device of the embodiment to a machine tool.
Figure 3:
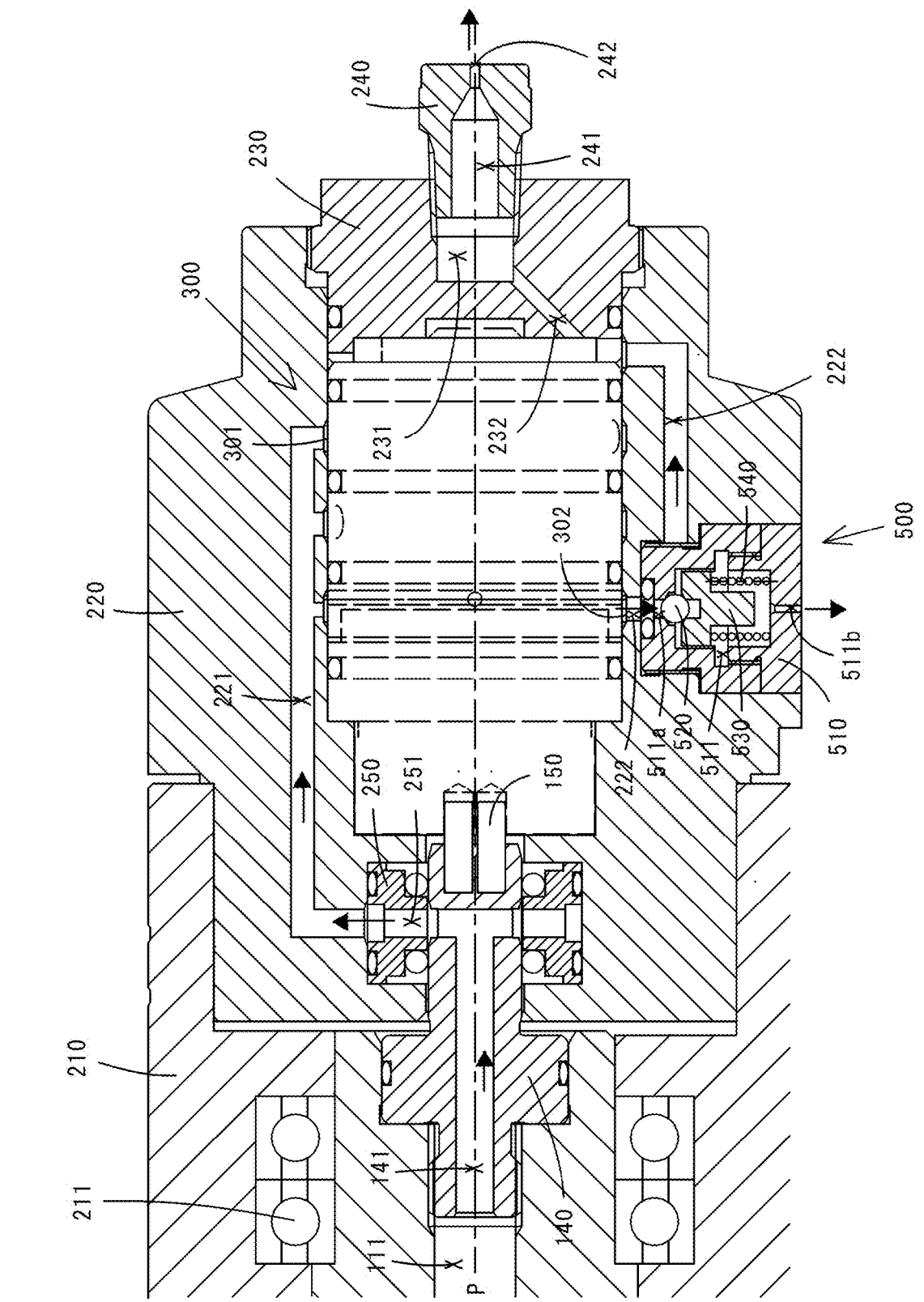
FIG. 3 is an enlarged view of an essential part of FIG. 1.
Figure 4:
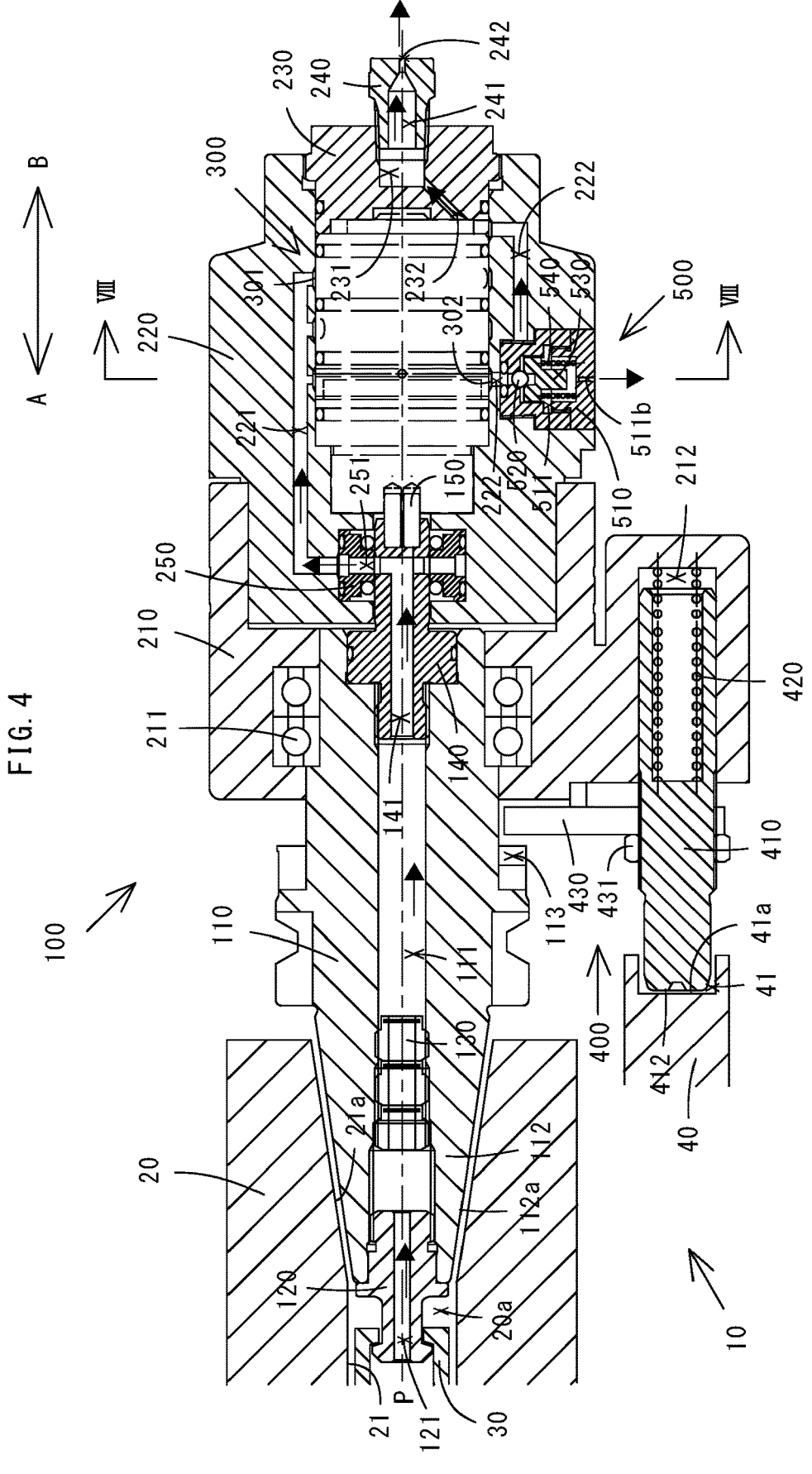
FIG. 4 shows a state in which the cooling medium spray device of the embodiment has been attached to the machine tool.
Figure 5:
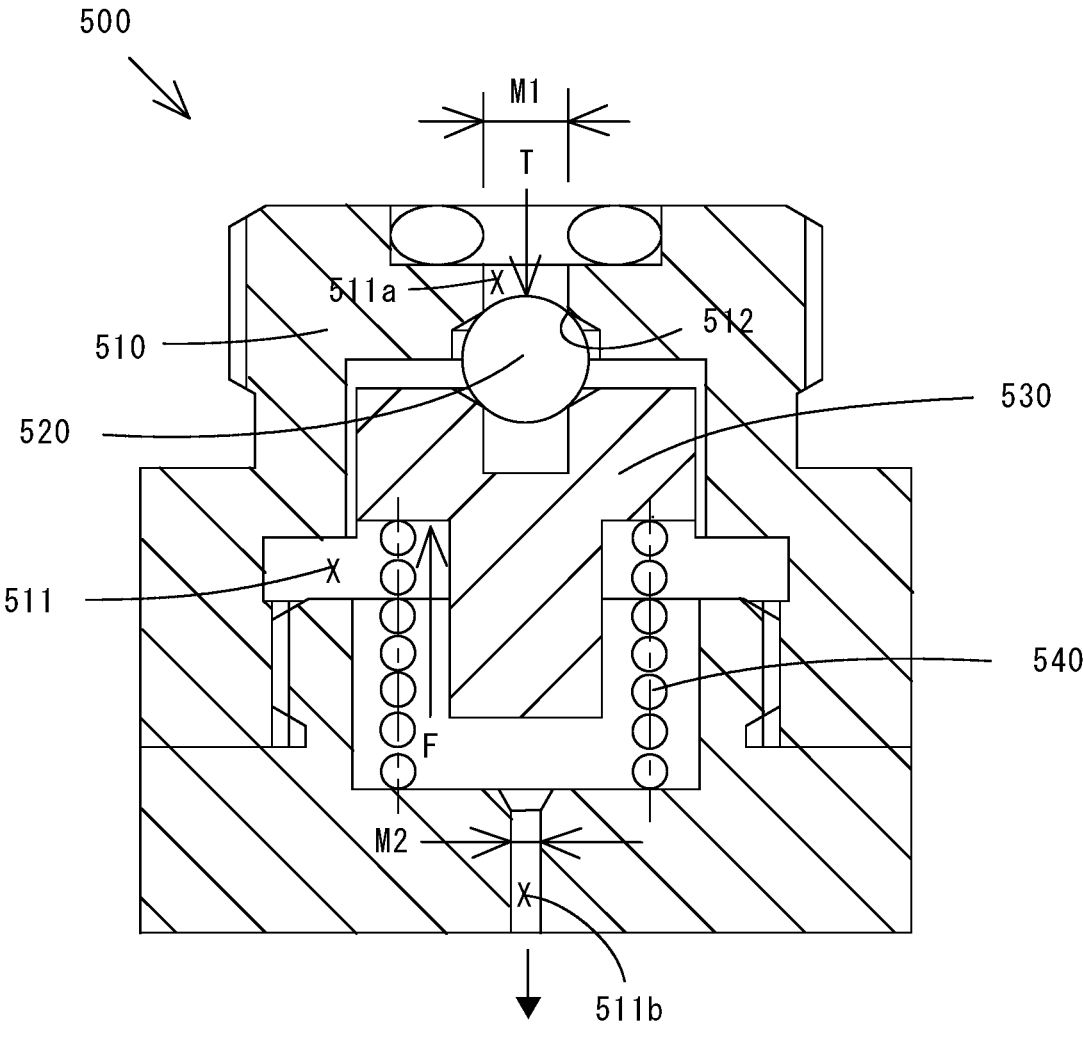
FIG. 5 is a sectional view of an example of a relief valve used in the cooling medium spray device of the embodiment.

FIG. 1 is a sectional view of a cooling medium spray device 100 according to the embodiment. FIG. 2 illustrates an operation that attaches the cooling medium spray device 100 of the embodiment to a machine tool 10. FIG. 3 is an enlarged view of an essential part of FIG. 1. FIG. 4 shows the state in which the cooling medium spray device 100 of the embodiment has been attached to the machine tool 10. FIG. 5 an example of a relief valve used in the cooling medium spray device 100 of the embodiment.

It is noted that, in the present embodiment, a cooling medium such as oil is supplied to a cutting edge of the tool for the purpose of lubrication between the workpiece and the tool, cooling of the workpiece and the tool, or removal (cleaning) of chips generated by the machining operation. Such a cooling medium is called a coolant. Thus, the cooling medium spray device of the present embodiment may also be called a "coolant spray device".

The cooling medium spray device 100 of the present embodiment has a body part, a support part, a cap 230, a nozzle 240, a pump 300, a rotation stopping device 400 and a pressure control device 500.

The body part includes a body member 110 and an adapter 140.

The body member 110 has a shank part 112 that can be attached to a main shaft 20 of the machine tool 10 at the rear end side. A body member outer peripheral surface portion 112a corresponding to the shank part 112 is formed with a tapered surface that is inclined such that its outer diameter decreases from the front end side toward the rear end side. As will be described below, the tapered surface of the body member outer peripheral surface portion 112a is formed to be capable of taper-fitting with a tapered surface of a main shaft inner peripheral surface portion 21a (described below) of the main shaft 20 of the machine tool 10. Furthermore, as will be described below, the body member 110 has an engagement hole 113 that is engageable with a rotation stopping lever 430 provided on a cover 210.

The body member 110 further has a body member passage 111 that extends through the center in the axial direction. The body member passage 111 is formed such that, in a state in which the shank part 112 of the body member 110 has been attached to the main shaft 20, cooling medium supplied from the main shaft 20 passes therethrough.

A filter 130 is disposed within the body member passage 111 and removes foreign matter contained in the cooling medium passing through the body member passage 111. A variety of known filters capable of removing foreign matter contained in the cooling medium can be used as the filter 130.

The adapter 140 is mounted on the front end side of the body member 110. In the present embodiment, a portion on the rear end part of the adapter 140 is screwed into a front end part of the body member passage 111. Furthermore, a portion on the front end side of the adapter 140 protrudes from a front end surface of the body member 110. A sealing member such as an O-ring is disposed between the body member 110 and the adapter 140.

The adapter 140 has an adapter passage 141 through which the cooling medium passes. In the present embodiment, the adapter passage 141 has a first passage portion that extends in the axial direction and a second passage portion that is connected to a front end of the first passage portion and extends in a radial direction. A rear end of the first passage portion fluidly communicates with the body member passage 111, and the second passage portion is open to an outer peripheral surface of a front end part of the adapter 140.

A "body part" of the present disclosure is constituted by the body member 110 and the adapter 140. A "body part passage" of the present invention is constituted by the body member passage 111 and the adapter passage 141.

The support part rotatably supports the body part (the body member 110 and the adapter 140) and a rotary part of the pump 300. The support part is constituted by a cover 210, a case 220 and a ring member 250.

The body member 110 is rotatably disposed within a cover interior space of the cover 210 via a bearing 211. Thus, the body member 110 is rotatable relative to the cover 210.

Further, the cover 210 has a hole 212 that is open at the rear end side while extending in the axial direction at a position spaced apart in a radial direction (in a direction orthogonal to the axial direction) from the cover interior space in which the body member 110 is disposed.

A rotation stopping pin 410 is inserted into the hole 212 so as to be movable in the extension direction of the hole 212. The rotation stopping pin 410 has a hole 411 that extends in the axial direction and is open at a front end side.

Furthermore, a spring 420 is disposed between a bottom surface 411a of the hole 411 and a bottom surface 212a of the hole 212.

Thus, owing to the elastic force generated by the spring 420, the rotation stopping pin 410 receives a force that moves (urges) it in a direction (toward the rear end side) of coming out from the hole 212.

A rotation stopping lever 430 is fixed to a rear end side of the rotation stopping pin 410. The position of the rotation stopping lever 430 in the axial direction is adjusted with a nut 431 that is screwed onto the rotation stopping pin 410.

In a state in which the body member 110 is not attached to the main shaft 20 (that state in which the cover 210 is not fixed to the machine tool 10), the rotation stopping pin 410 moves (is urged) in the direction (toward the rear end side) of coming out from the hole 212 owing to the elastic force of the spring 420. Then, the rotation stopping lever 430 moves, in conjunction with the movement of the rotation stopping pin 410, to an engagement position (shown by a broken line in FIG. 2) and engages with (in) the engagement hole 113 of the body member 110. As a result, rotation of the body member 110 relative to the cover 210 is prevented (blocked). In this manner, in the state in which the body member 110 is not attached to the main shaft 20, rotation of the body member 110 relative to the cover 210 is prevented. In this situation, because rotary parts (the body member 110, the adapter 140 and the rotary part of the pump 300) that rotate in conjunction with rotation of the main shaft 20 and fixed parts (the cover 210, the case 220, the cap 230 and the nozzle 240) that are fixed to the machine tool 10 become united (fixed relative to each other), the rotary parts and the fixed parts can be easily managed (e.g., when the cooling medium spray device is being moved from a tool magazine to be attached to the machine tool), because the rotary parts are not rotatable relative to the fixed parts. For example, the rotary parts and the fixed parts can be easily carried.

On the other hand, in the state in which the body member 110 has been attached to the main shaft 20 (the state in which the cover 210 is fixed to the machine tool 10), the rotation stopping pin 410 moves in a direction (toward the front end side) of being inserted (moved deeper) into the hole 212 against the elastic force of the spring 420. Then, the rotation stopping lever 430 moves, in conjunction with the movement of the rotation stopping pin 410, to a disengagement position (shown by a solid line in FIG. 2) where engagement with the engagement hole 113 of the body member 110 is released. As a result, rotation of the body member 110 relative to the cover 210 becomes possible.

The case 220 is fixed to a front end part of the cover 210 by one or more bolts, or the like. It is noted that the position of the case 220 around the center line P is adjustable relative to the cover 210. Thus, the discharging direction of the cooling medium from an outlet part (port) 511b of the relief valve 500 can be adjusted (this point will be further described below).

The case 220 has a first case passage 221 and a second case passage 222.

The ring member 250 is disposed between a portion of the rear end part of the case 220 and a portion of the front end part of the adapter 140. The ring member 250 has a ring member passage 251 that extends in the radial direction and is open to the inner peripheral surface and to the outer peripheral surface of the ring member 250. The ring member 250 is disposed such that the ring member passage 251 communicates with the adapter passage 141 (specifically, the second passage portion of the adapter passage 141) and the first case passage 221.

Sealing members (such as O-rings) are disposed between the ring member 250 and the adapter 140 and between the ring member 250 and the case 220.

The pump 300 has a rotary part that is disposed in a rotatable manner within the case interior space of the case 220. A variety of configurations of known pumps having a rotary part can be used as the pump 300. In the present embodiment, an internal gear pump is used.

A rear end side of the rotary part of the pump 300 is connected to the body member 110. In the present embodiment, the rear end side of the rotary part of the pump 300 is connected via a knock pin 150 to the adapter 140 that is connected to the body member 110. Furthermore, a portion of the front end side of the rotary part of the pump 300 is rotatably supported within a recess that is formed in the cap 230 that is described below. In other words, the rotary part of the pump 300 is rotatably disposed within the case interior space of the case 220. Thus, the rotary part of the pump 300 rotates in conjunction with rotation of the body member 110 that can be attached to the main shaft 20.

The pump 300 has an inlet part 301 and an outlet part 302. When the rotary part is rotating, the pump 300 increases the pressure of the cooling medium suctioned from the inlet part 301 and discharges the pressurized cooling medium from the outlet part 302.

The outlet part 302 fluidly communicates with the second case passage 222.

A "support part" of the present disclosure is constituted by the cover 210, the case 220 and the ring member 250. In addition, a "first passage of the support part" of the present disclosure is constituted by the ring member passage 251 and the first case passage 221. In addition, a "second passage of the support part" of the present disclosure is constituted by the second case passage 222. Furthermore, a "pump" of the present disclosure is constituted by the case 220, the rotary part, the inlet part 301 and the outlet part 302.

The cap 230 is fixed to the front end side of the case 220 with one or more bolts or the like so as to close up the case interior space of the case 220.

The cap 230 has a nozzle mounting hole 231 in which the nozzle 240 is mounted, and a cap passage 232 that fluidly communicates with the nozzle mounting hole 231.

The cap 230 is fixed to the case 220 such that the cap passage 232 fluidly communicates with the second case passage 222.

The nozzle 240 has a nozzle passage 241 that fluidly communicates with a spray hole 242.

The nozzle 240 is mounted in the nozzle mounting hole 231 of the cap 230 such that the nozzle passage 241 fluidly communicates with the nozzle mounting hole 231.

It is noted that a fixing part 40 is provided on the machine tool 10 (see FIG. 2).

A fitting hole 41 is provided in the fixing part 40, in which a rear end part of the rotation stopping pin 410 is fitted (inserted) in the state in which the body member 110 has been attached to the main shaft 20.

Furthermore, an abutment part that abuts on a rotation stopping pin rear end surface 412 is provided on a wall surface 41*a* (i.e. the surface that opposes the rotation stopping pin rear end surface 412 of the rotation stopping pin 410 in the state in which the rear end part of the rotation stopping pin 410 is fitted in the fitting hole 41) of the fitting hole 41. In the present embodiment, the wall surface (bottom surface) 41*a* of the fitting hole 41 is used as the abutment part.

The engagement hole 113 of the body member 110 corresponds to an "engagement part" of the present disclosure. In addition, the rotation stopping lever 430 fixed to the rotation stopping pin 410 corresponds to an "engaging member" of the present disclosure. In addition, the spring 420 corresponds to a "second elastic force generating part" or a "rotation stopping elastic force generating part" of the present disclosure.

A "rotation stopping device" of the present disclosure is constituted by the rotation stopping pin 410, the spring 420, the rotation stopping lever 430, the engagement hole 113, the fitting hole 41 and the wall surface 41*a* of the fitting hole 41.

Further, the relief valve 500 is disposed in the case 220.

As shown in FIGS. 3 to 5, the relief valve 500 has a relief valve body 510, a steel ball 520, a valve element support member 530 and a relief spring 540.

A relief valve passage 511 is provided in the relief valve body 510. The relief valve passage 511 has an inlet part 511*a* on the inflow side and the outlet part 511*b* on the outflow side. The inlet part 511*a* communicates with the second case passage 222. A valve seat 512 is provided in the inlet part 511*a*.

The steel ball 520 is formed (sized) to be capable of opening and closing the valve seat 512.

The steel ball 520 is supported by the valve element support member 530. The valve element support member 530 is disposed so as to be movable along the extension direction of the relief valve passage 511. Furthermore, in this configuration, the elastic force generated by the relief spring 540 acts as a force that moves (urges) the valve element support member 530 toward the inlet part 511*a*. Thus, the steel ball 520 receives a force that moves (urges) the steel ball 520 in a direction of closing the valve seat 512 owing to the elastic force generated by the relief spring 540.

Furthermore, it is configured such that the pressure of the cooling medium within the inlet part 511*a* (the second case passage 222) acts as a force that moves the steel ball 520 in a direction of opening the valve seat 512.

The steel ball 520 moves based on the pressure T of the cooling medium within the inlet part 511*a* (the second case passage 222) and a pressure set value Ts corresponding to the elastic force F generated by the relief spring 540, and thereby opens and closes the valve seat 512.

That is, when the pressure T of the cooling medium within the second case passage 222 reaches the pressure set value Ts, the steel ball 520 and the valve element support member 530 move in the direction of opening the valve seat 512 (downward in FIGS. 3 to 5) against the elastic force of the relief spring 540. As a result, cooling medium within the second case passage 222 is discharged via the inlet part

511*a*, the valve seat 512 and the outlet part 511*b*, such that the pressure T of the cooling medium within the second case passage 222 decreases.

When the pressure T of the cooling medium within the inlet part 511*a* (the second case passage 222) decreases, the steel ball 520 and the valve element support member 530 move in the direction of closing the valve seat 512 (upward in FIGS. 3 to 5) owing to the elastic force generated by the relief spring 540.

In the present embodiment, sectional area (cross-sectional area) S2 of the outlet part 511*b* of the relief valve 500 is smaller than sectional area (cross-sectional area) S1 of the inlet part 511*a* (S2<S1). In FIG. 5, diameter M1 of the inlet part 511*a* and diameter M2 (<M1) of the outlet part 511*b* are shown.

Figure 6:
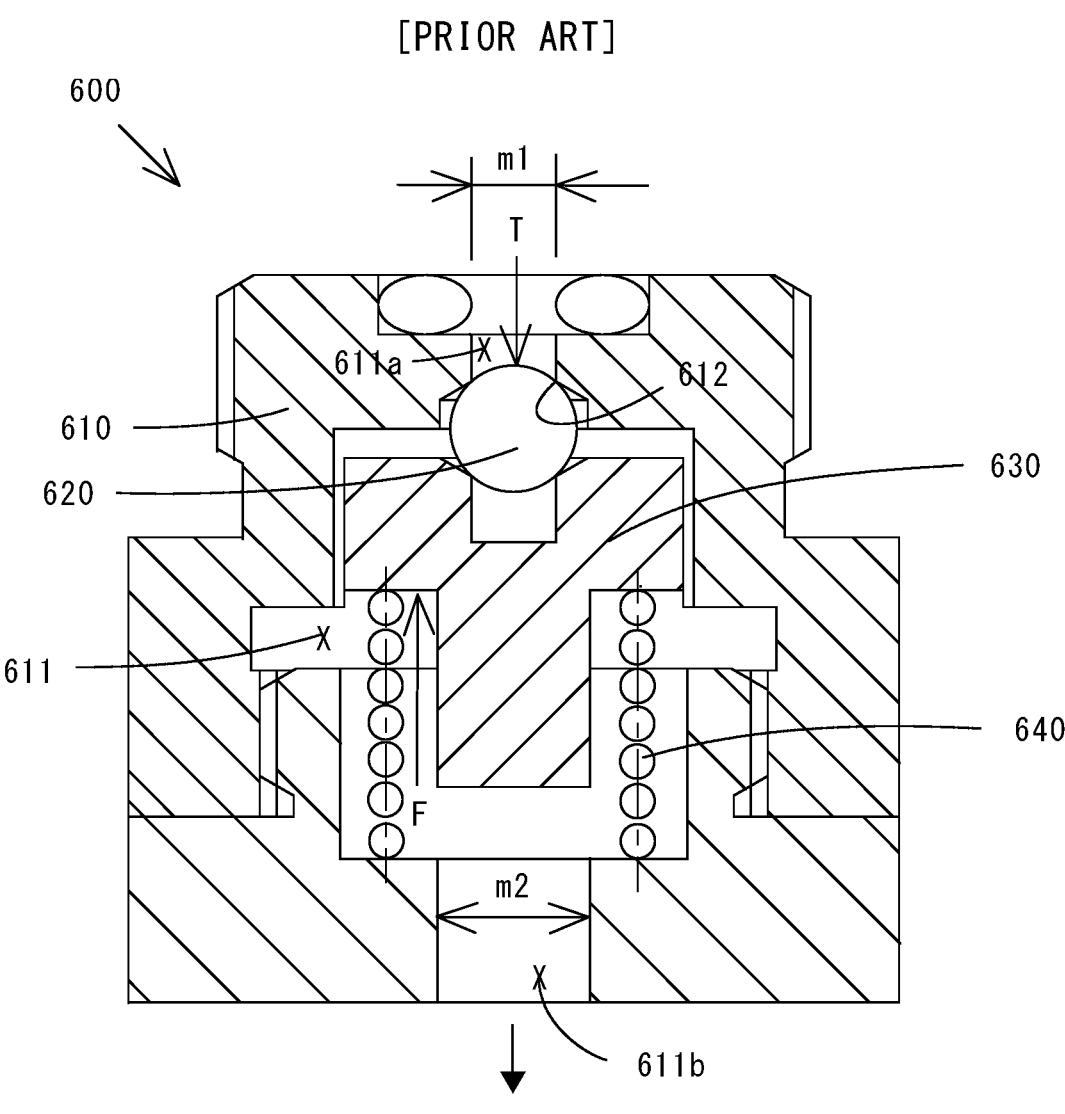
FIG. 6 is a sectional view of a common relief valve.

It is noted that a known relief valve 600 is shown in FIG. 6. Sectional area (cross-sectional area) s2 of an outlet part 611*b* of the relief valve 600 is larger than sectional area (cross-sectional area) s1 of an inlet part 611*a* (s2>s1). In FIG. 6, diameter m1 of the inlet part 611*a* and diameter m2 (>m1) of the outlet part 611*b* are shown.

This point will be further described below.

A "pressure control device" of the present disclosure is constituted by the relief valve 500. In addition, the relief valve passage 511 corresponds to a "discharge passage" of the present disclosure, the valve seat 512 corresponds to a "valve seat" of the present disclosure, the steel ball 520 corresponds to a "valve element" of the present disclosure, and the relief spring 540 corresponds to a "first elastic force generating part" or a "pressure controlling elastic force generating part" of the present disclosure.

Next, an example of an operation that attaches the cooling medium spray device 100 of the present embodiment to the machine tool 10 will be described with reference to FIG. 2.

A pull stud 120 is attached to a rear end side of the body member 110. For example, a male thread formed (defined) on an outer peripheral surface of the pull stud 120 is threadedly engaged with a female thread formed (defined) in a body member inner peripheral surface that forms the body member passage 111. The pull stud 120 has a pull stud passage 121 that extends through the center in the axial direction, in which both ends are open. By attaching the pull stud 120 to the rear end side of the body member 110, the body member passage 111 fluidly communicates with the pull stud passage 121.

A portion of the rear end side of the pull stud 120 is inserted into a main shaft interior space 20*a* that is formed (defined) by a main shaft inner peripheral surface 21 of the main shaft 20 of the machine tool 10. Then, the pull stud 120 is pulled toward the machine tool 10 side (toward the rear end side) using a pulling-in member 30 provided on the machine tool 10 side. The main shaft inner peripheral surface portion 21*a* of the front end side of the main shaft inner peripheral surface 21 is formed as a tapered surface that is inclined such that its inner diameter decreases from the front end side to the rear end side. Thus, when the pull stud 120 is pulled into the main shaft interior space 20*a*, the main shaft inner peripheral surface portion 21*a* is taper-fitted with the body member outer peripheral surface portion 112*a*. Thus, the body member outer peripheral surface portion 112*a* (the shank part 112) is fixedly held by the main shaft inner peripheral surface portion 21*a*. That is, the body member 110 can be attached to the main shaft 20.

Furthermore, by moving the body member 110 toward the rear end side, the cover 210 also moves toward the rear end side. Then, when the rotation stopping pin rear end surface 412 of the rotation stopping pin 410 provided in the cover 210 is fitted into the fitting hole 41 formed on the machine tool 10 side, the rotation stopping pin rear end surface 412 abuts on the wall surface 41a of the fitting hole 41. Thus, the rotation stopping pin 410 moves against the elastic force generated by the spring 420 in the direction of being inserted (moving deeper) into the hole 212 (toward the front end side).

It is noted that, by fitting (inserting) the rotation stopping pin rear end surface 412 of the rotation stopping pin 410 into the fitting hole 41, the rotation stopping pin 410 is fixed to the machine tool 10. Thus, rotation of the cover 210 and the case 220 around the body member 110 (around the center line P) is prevented (blocked).

Furthermore, when the rotation stopping pin 410 is moved toward the front end side, the rotation stopping lever 430 fixed to the rotation stopping pin 410 also moves toward the front end side. Then, in the state in which the body member 110 has been attached to the main shaft 20, the rotation stopping lever 430 moves to the disengaging position (the state shown by a solid line in FIG. 2) where the engagement with the engagement hole 113 of the body member 110 is released. When the engagement of the rotation stopping lever 430 with (in) the engagement hole 113 is released, the body member 110, the adapter 140 connected to the body member 110, and the rotary part of the pump 300 become rotatable relative to the cover 210 and the case 220 (the support part) fixed to the cover 210.

In such a state, when the main shaft 20 rotates, the rotary part of the pump 300, which is connected to the main shaft 20 via the body member 110, the adapter 140 and the knock pin 150, also rotates.

When the rotary part of the pump 300 rotates, the cooling medium supplied from the main shaft 20 is led to the inlet part 301 of the pump 300 via the pull stud passage 121, the body member passage 111 (including the filter 130), the adapter passage 141, the ring member passage 251 and the first case passage 221. Then, the cooling medium, the pressure of which has been increased (pressurized) by the pump 300, is conducted into the nozzle passage 241 via the outlet part 302 of the pump 300, the second case passage 222, the cap passage 232 and the nozzle mounting hole 231 and is sprayed from the spray hole 242.

In the present embodiment, the cover 210 is fixed to the machine tool 10, the case 220 is fixed to the cover 210, the cap 230 is fixed to the case 220, and the nozzle 240 is attached to the cap 230. That is, the nozzle 240 is fixed in a non-rotatable manner to the machine tool 10 via the cap 230, the case 220 and the cover 210. Therefore, unlike in the above-described prior art device, the cooling medium that is sprayed from the spray hole 242 of the nozzle 240 is not affected by centrifugal force caused by rotation of the spray hole, and the cooling medium can be sprayed toward a prescribed location in a focused manner.

Foreign matter contained in the cooling medium is removed by the filter 130 disposed in the body member passage 111.

An example of an operation when machining a workpiece using a tool will be described. In the following, a machine tool (called a "machining center"), which is equipped with a tool magazine that is configured to house a plurality of tool holders each holding a tool, is described. In such a machine tool, in accordance with a machine program, a tool holder is selected from among the plurality of tool holders housed in the tool magazine and is mounted on the main shaft. Then, a workpiece is machined using a tool held by the selected tool holder. In this state, the cooling medium can be supplied from the main shaft 20 to the tool holder mounted on the main shaft 20.

The cooling medium spray device 100 of the present embodiment is housed in the tool magazine together with the plurality of tool holders.

A workpiece is attached to the machine tool.

A tool holder holding a tool required for the machining is selected from among the tool holders housed in the tool magazine, and is mounted on the main shaft 20. The workpiece is machined using the tool held by the tool holder mounted on the main shaft 20.

After the workpiece machining has been performed, the cooling medium spray device 100 housed in the tool magazine is set to a ready-for-use state. Specifically, the body member 110 of the cooling medium spray device 100 is attached to the main shaft 20, and the cover 210 is fixed to the machine tool 10 (the body side on which the main shaft 20 is rotatably supported). Thus, cooling medium that is being supplied from the main shaft 10 can now be sprayed from the spray hole 182 of the nozzle 180.

Then, the rotational speed of the main shaft 20, to which the body member 110 of the cooling medium spray device 100 is attached, is set such that the pressure of the cooling medium, which is sprayed from the spray hole 242 of the nozzle 240 of the cooling medium spray device 100, becomes a pressure capable of removing chips and burrs.

Then, the cooling medium spray device 100 (or the workpiece) is moved while spraying the cooling medium from the spray hole 242 of the nozzle 240 to positions where chips remain (or chips are likely to remain) on the machined workpiece or to a position where burrs occur (or burrs are likely to occur) on the machined workpiece.

As described above, by using the cooling medium spray device 100 of the present embodiment, the cooling medium supplied from the main shaft 20 can be sprayed in a prescribed direction in a focused manner in a pressurized state. Thus, chips remaining on the machined workpiece or burrs occurring on the workpiece during machining can be reliably removed with a simple structure without the need for the operator to manually (or otherwise) remove the chips and/or burrs.

It is noted that the operation of removing chips and burrs by using the cooling medium spray device 100 is not limited to the above-described operation.

As described above, the pump 300 increases the pressure of the cooling medium suctioned from the inlet part 301 to a pressure corresponding to the rotational speed of the rotary part and discharges the pressurized cooling medium from the outlet part 302. Furthermore, the relief valve 500 prevents the pressure T of the cooling medium from exceeding the pressure set value Ts by opening and closing the valve seat 512 using the steel ball 520 based on the pressure T of the cooling medium within the second case passage 222 (the inlet part 511a) and the pressure set value Ts corresponding to the elastic force F of the relief spring 540.

The characteristics of the pump 300 and the pressure set value Ts of the relief valve 500 are set such that cooling medium, which has a pressure capable of removing chips and burrs generated during machining of a workpiece, is sprayed from the spray hole 242 of the nozzle 240.

Here, performance deterioration of the pump 300, clogging of the spray hole 242 of the nozzle 240, etc. occur with usage of the cooling medium spray device 100. When performance of the pump 300 has deteriorated or the spray hole 242 of the nozzle 240 has clogged, it is necessary to inspect, repair or replace the cooling medium spray device 100 (the pump 300, the nozzle 240 and so on).

The present embodiment is configured such that the operating state (condition) of the cooling medium spray device 100, including the state in which performance of the pump 300 has deteriorated, the state in which the spray hole 242 of the nozzle 240 is clogged, etc., can be easily determined with a simple structure.

That is, in the known relief valve 600 shown in FIG. 6, the sectional area s2 of the outlet part 611*b* is larger than the sectional area s1 of the inlet part 611*a* (s2>s1).

On the other hand, in the relief valve 500 used in the present embodiment, as shown in FIG. 5, the sectional area S2 of the outlet part 511*b* is smaller than the sectional area S1 of the inlet part 511*a* (S2<S1).

Furthermore, the pump 300 is configured such that it has the characteristic in which cooling medium having a prescribed pressure Tr that is higher than the pressure set value Ts of the relief valve 500 is discharged at a prescribed rotational speed Ns when removing chips and burns remaining on the workpiece.

Thus, in the present embodiment, the operating state of the cooling medium spray device 100 can be determined by visually observing the discharge state of the cooling medium from the outlet part 511*b* of the relief valve 500.

The discharge state of the cooling medium from the outlet part 511*b* of the relief valve 500 will be described with reference to FIGS. 7 and 8.

Figure 7:
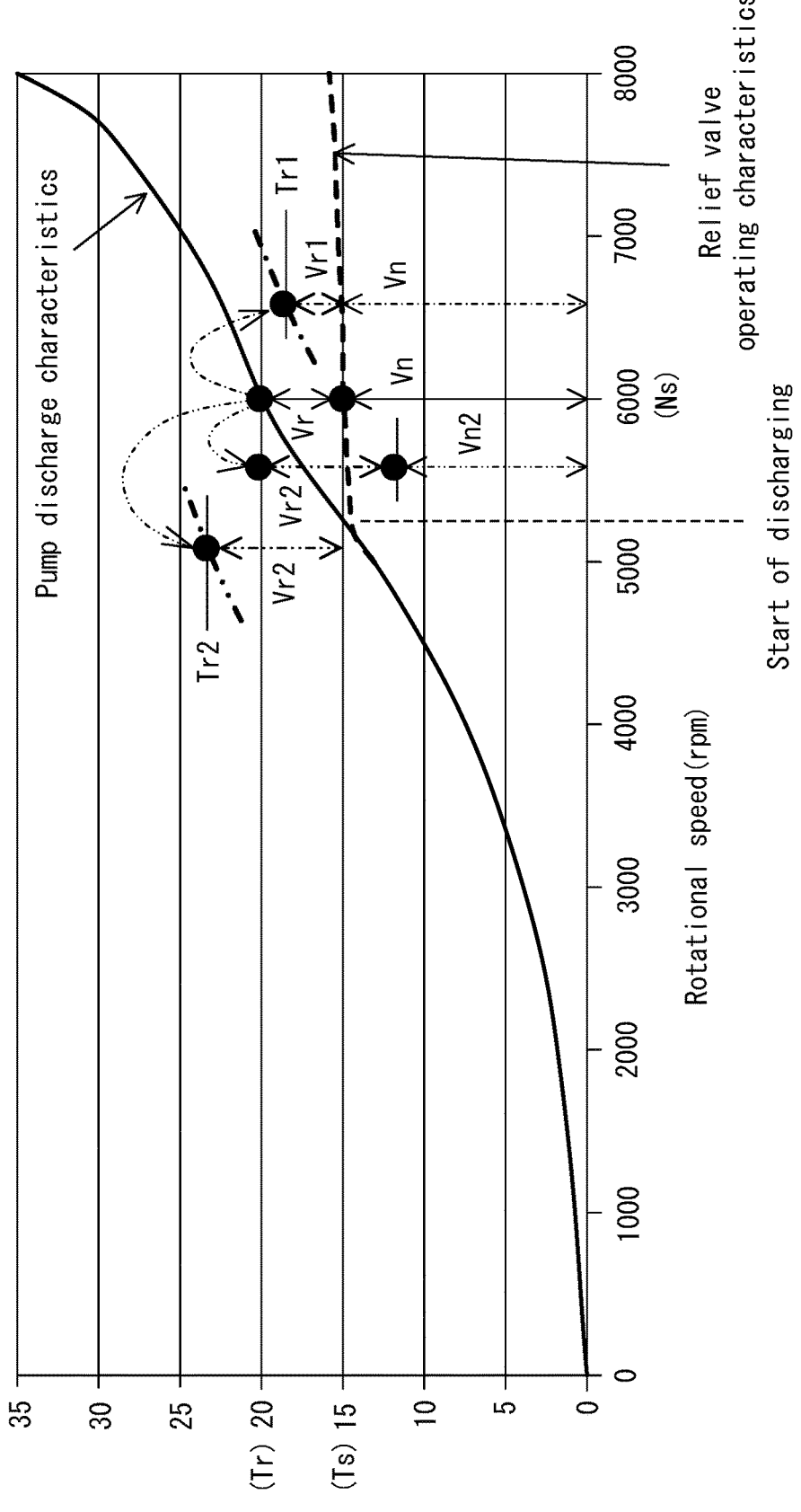
FIG. 7 is a graph that explains an operation of the cooling medium spray device of the embodiment.

FIG. 7 shows the discharge characteristics ("rotational speed-discharge pressure characteristics") of the pump 300 and the operating characteristics of the relief valve 500.

It is noted that the discharge characteristics of the pump 300 shown in FIG. 7 are in the state in which the spray hole 242 of the nozzle 240 having a diameter of 0.4 mm is attached and the relief valve 500 is not attached. The discharge characteristics shown in FIG. 7 change according to the diameter (degree of clogging) of the spray hole 242 of the nozzle 240.

Figure 8:
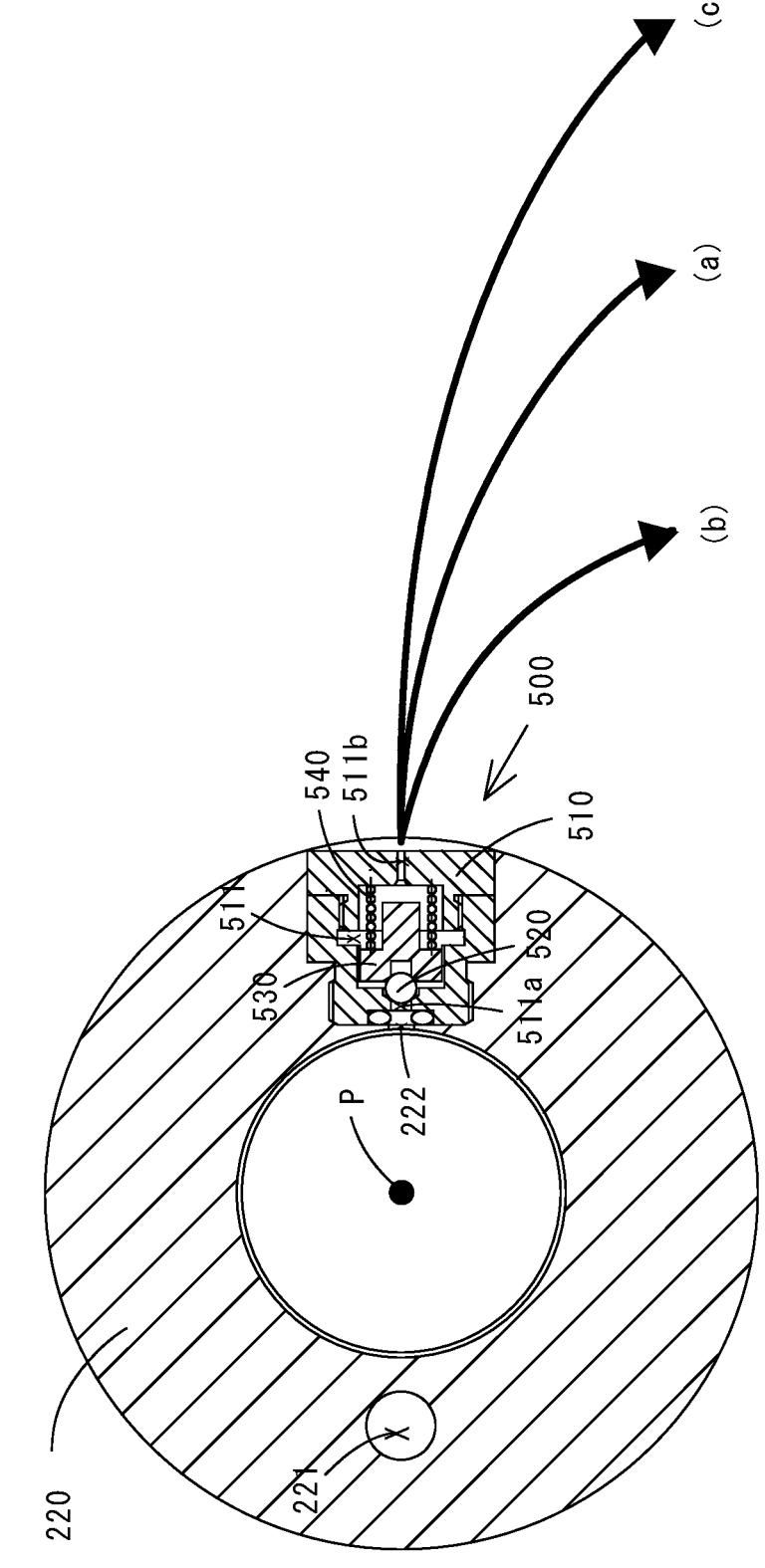
FIG. 8 shows the discharge state of the cooling medium from an outlet part of the relief valve in the cooling medium spray device of the embodiment.

FIG. 8 is a sectional view taken along line VIII-VIII in FIG. 4. In FIG. 8, the relief valve 500 is arranged such that the cooling medium is discharged from the outlet part 511*b* of the relief valve 500 in a horizontal direction. As described above, the position of the case 220 around the center line P is adjustable relative to the cover 210. Thus, the direction of discharging the cooling medium from the outlet part 511*b* of the relief valve 500 can be adjusted (rotated) to any position around the center line P.

It is noted that the direction of discharging the cooling medium from the outlet part 511*b* of the relief valve 500 may be set such that a change of the discharge state (such as the discharge flow rate, the discharge speed and the discharge trajectory) of the cooling medium from the outlet part 511*b* can be determined by visual observation. For example, the direction of discharging the cooling medium can be set to an obliquely downward direction relative to the horizontal direction.

The expression "discharging the cooling medium from the outlet part in the horizontal direction" is intended to encompass "discharging the cooling medium in an oblique direction relative to the horizontal direction".

In the present embodiment, the relief valve 500 is configured such that it has the operating characteristics shown in FIG. 7.

Specifically, the relief valve 500 prevents the pressure T of the cooling medium within the inlet part 511*a* (the second case passage 222) from exceeding the pressure set value Ts (=15 MPa). The operating characteristics of the relief valve

500 are set based on the pressure of the cooling medium that can remove chips, burrs, etc. remaining on the workpiece.

Furthermore, the pump 300 is configured such that it has the discharge characteristics shown in FIG. 7.

Specifically, the pump 300 is configured such that, when the rotary part of the pump 300 is rotating at the prescribed rotational speed Ns (=6000 rpm), the pressure T of the cooling medium discharged from the outlet part 302 of the pump 300 becomes a prescribed pressure Tr (=20 Mpa) that is larger (greater) than the pressure set value Ts of the relief valve 500.

It is noted that the pressure set value Ts, the prescribed rotational speed Ns and the prescribed pressure Tr are appropriately settable.

When the cooling medium is being sprayed from the spray hole 242 of the nozzle 240 using the cooling medium-spray device 100, the main shaft 20 (the rotary part of the pump 300) is rotating at the prescribed rotational speed Ns.

The pump 300 is configured such that, at the prescribed rotational speed Ns, cooling medium having the prescribed pressure Tr (>Ts) is being discharged from the outlet part (port) 302. Thus, at the prescribed rotational speed Ns, a first portion of the pressurized cooling medium that is being discharged from the outlet part 302 of the pump 300 (flow rate Qr corresponding to the discharge pressure Tr) is sprayed from the spray hole 242 of the nozzle 240 (flow rate Vn) and a second portion of the pressurized cooling medium is also simultaneously being discharged (ejected) from the outlet part 511*b* of the relief valve 500 (flow rate Vr–Qr–Vn).

In a normal operating state, cooling medium is discharged (ejected) from the outlet part 511*b* of the relief valve 500 along a discharge trajectory shown by arrow (a) in FIG. 8.

When the rotary part of the pump 300 is rotating at the prescribed rotational speed Ns in the state in which the performance of the pump 300 has deteriorated, the pressure T of the cooling medium that is being discharged from the outlet part 302 of the pump 300 decreases below the prescribed pressure Tr. For example, when the discharge characteristics of the pump 300 have become as shown by a vertical one dot-dash line in FIG. 7, cooling medium having the pressure Tr1 (<Tr) is being discharged from the outlet part 302 of the pump 300. In this situation, pressurized cooling medium discharged from the outlet part 302 of the pump 300 (flow rate Qr1 corresponding to the discharge pressure Tr1) (Qr1<Qr) is being sprayed from the spray hole 242 of the nozzle 240 (the flow rate Vn) and also being discharged (ejected) from the outlet part 511*b* of the relief valve 500 (flow rate Vr1=Qr1–Vn) (Vr1<Vr). That is, the flow rate of the cooling medium being discharged from the outlet part 511*b* of the relief valve 500 decreases as compared to normal operation.

Thus, when the performance of the pump 300 of the present embodiment has deteriorated, cooling medium is being discharged (ejected) from the outlet part 511*b* of the relief valve 500 along the discharge trajectory shown by arrow (b) in FIG. 8. That is, the discharge trajectory shown by arrow (b) in FIG. 8 depicts a parabola that falls at a position on the outlet part 511*b* side (a position closer to the outlet part 511*b*) than the discharge trajectory (normal discharge trajectory) shown by arrow (a) in FIG. 8.

Therefore, the possibility that the performance of the pump 300 has deteriorated can be determined by visually observing that the discharge trajectory of the cooling medium from the outlet part 511*b* of the relief valve 500 has changed from the discharge trajectory shown by arrow (a) in FIG. 8 to the discharge trajectory shown by arrow (b) in FIG. 8.

The discharge trajectory of the cooling medium from the outlet part 511*b* of the relief valve 500 continuously changes from the discharge trajectory shown by arrow (a) in FIG. 8 to the discharge trajectory shown by arrow (b) in FIG. 8 as the pressure T of the cooling medium discharged from the outlet part 302 of the pump 300 decreases from the prescribed pressure Tr. Therefore, by visually observing the discharge trajectory of the cooling medium discharged from the outlet part 302 of the pump 300, it can be determined how much the pressure T of the cooling medium being discharged from the outlet part 302 of the pump 300 has decreased compared to the prescribed pressure Tr, that is, how much the performance of the pump 300 has deteriorated compared to normal performance (normal operating state).

On the other hand, when the rotary part of the pump 300 is rotating at the prescribed rotational speed Ns in the state in which the spray hole 242 of the nozzle 240 has clogged, the flow rate of the cooling medium being sprayed from the spray hole 242 of the nozzle 240 decreases. For example, as shown by a vertical two-dot dash line in FIG. 7, the flow rate of the cooling medium being sprayed from the spray hole 242 of the nozzle 240 decreases to flow rate Vn2 (<Vn).

In this situation, a first portion of the pressurized cooling medium being discharged from the outlet part 302 of the pump 300 (the flow rate Qr corresponding to the discharge pressure Tr) is being sprayed from the spray hole 242 of the nozzle 240 (the flow rate Vn2<Vn) and a second portion of the pressurized cooling medium is also being discharged (ejected) from the outlet part 511*b* of the relief valve 500 (flow rate Vr2–Qr–Vn2) (Vr2>Vr). That is, the flow rate of the cooling medium being discharged (ejected) from the outlet part 511*b* of the relief valve 500 increases as compared to normal operation.

Here, the discharge state of the cooling medium being discharged from the outlet part 511*b* when the spray hole 242 of the nozzle 240 has clogged corresponds to the discharge state of the cooling medium being discharged from the outlet part 511*b* when the pressure T of the cooling medium discharged from the outlet part 502 has increased (the discharge characteristics shown by the two-dot chain line in FIG. 7). The discharge characteristics shown by the two-dot chain line in FIG. 7 show that, at the prescribed rotational speed Ns, the pressure T of the cooling medium being discharged from the outlet part 502 is discharge pressure Tr2(>Tr) and the cooling medium is being discharged at flow rate Qr2(>Qr) corresponding to the discharge pressure Tr2.

Thus, in the present embodiment, when the spray hole 242 of the nozzle 240 has clogged, the cooling medium is discharged from the outlet part 511*b* of the relief valve 500 along the discharge trajectory shown by arrow (c) in FIG. 8. That is, the discharge trajectory shown by arrow (c) in FIG. 8 depicts a parabola that falls at a position on the opposite side (a position distant) from the outlet part 511*b* relative to the discharge trajectory (normal discharge trajectory) shown by arrow (a) in FIG. 8.

Therefore, the possibility that the spray hole 242 of the nozzle 240 has clogged (the pressure of the cooling medium discharged from the pump 300 has increased) can be determined by visually observing that the discharge trajectory of the cooling medium from the outlet part 511*b* of the relief valve 500 has changed from the discharge trajectory shown by arrow (a) in FIG. 8 to the discharge trajectory shown by arrow (c) in FIG. 8.

That is, by visually determining that the discharge trajectory of the cooling medium has changed from the discharge trajectory shown by arrow (a) in FIG. 8 (i.e. the normal operating state) to the discharge trajectory shown by arrow (c) in FIG. 8, it can be determined that there is a possibility that the spray hole 242 of the nozzle 240 has clogged.

It is noted that the discharge trajectory of the cooling medium from the outlet part 511*b* of the relief valve 500 continuously changes from the (normal) discharge trajectory shown by arrow (a) in FIG. 8 to the discharge trajectory shown by arrow (c) in FIG. 8 as the degree of clogging of the spray hole 242 of the nozzle 240 increases (i.e. as the pressure T of the cooling medium discharged from the outlet part 302 of the pump 300 increases from the prescribed pressure Tr). Therefore, by visually observing the discharge trajectory of the cooling medium discharged from the outlet part 302 of the pump 300, the degree of clogging of the spray hole 242 of the nozzle 240 (i.e. the degree of increase of the pressure T of the cooling medium being discharged from the outlet part 302 of the pump 300 relative to the prescribed pressure Tr) can be determined.

Any appropriate method can be used to select the sectional area (cross-sectional) S1 of the inlet part 511*a* and the sectional area (cross-sectional) S2 of the outlet part 511*b* of the relief valve 500 and the discharge characteristics of the pump 300 (the discharge pressure Tr at the prescribed rotational speed Ns) such that a change of the discharge state (such as the discharge speed, the discharge amount and the discharge trajectory) of the cooling medium from the outlet part 511*b* of the relief valve 500 can be determined by visual observation.

For example, the following method can be used.

By visual observation, an operator can easily determine a change of the discharge speed of the cooling medium from the outlet part 511*b* of the relief valve 500 from the "prescribed speed" to "0 (zero)" or from the "prescribed speed" to "1.5 to 2 times or more of the prescribed speed".

Here, as shown in FIG. 7, when the pressure T of the cooling medium being discharged from the pump 300 decreases below the pressure set value Ts, cooling medium is not being discharged from the outlet part 511*b* of the relief valve 500. That is, the discharge speed of the cooling medium becomes "0 (zero)".

Further, a lower limit and an upper limit of the pressure T of the cooling medium discharged from the outlet part 302 of the pump 300 are set.

Then, the sectional area S1 of the inlet part 511*a* and the sectional area S2 of the outlet part 511*b* of the relief valve 500 and the discharge characteristics of the pump 300 (the discharge pressure Tr at the prescribed rotational speed Ns) are set such that the discharge speed of the cooling medium from the outlet part 511*b* of the relief valve 500 becomes "0 (zero)" when the discharge pressure T of the cooling medium reaches the lower limit, while the discharge speed of the cooling medium from the outlet part 511*b* of the relief valve 500 becomes 1.5 to 2 times or more than the normal discharge speed when the discharge pressure T of the cooling medium reaches the upper limit.

In this manner, it can be determined at least that the discharge pressure T of the cooling medium has reached the lower limit or that it has reached the upper limit (the spray hole 242 of the nozzle 240 is clogged) by visually observing the discharge state of the cooling medium from the outlet part 511*b* of the relief valve 600.

Because the sectional area s2 of the outlet part 611*b* of the known relief valve 600 shown in FIG. 6 is larger than the sectional area s1 of the inlet part 611*a* (s2>s1), the discharge state of the cooling medium from the outlet part 611*b* of the relief valve 600 practically does not change even if the discharge pressure of the cooling medium from the outlet part 302 of the pump 300 changes.

Therefore, the change of the discharge state of the cooling medium from the outlet part 611*b* of the relief valve 600 cannot be determined by visual observation of the known relief valve 600 shown in FIG. 6.

The present invention is not limited to the configuration described in the above-described embodiment, and a variety of modifications, additions and omissions are possible.

The pressure control device is not limited to the relief valve and may only prevent the pressure of the cooling medium within the second case passage (the second passage) from exceeding the pressure set value.

Although the body part was constituted by a body member and an adapter that are separate bodies, the body part can also be constituted by (as) a single member. Furthermore, the shape and structure of the body part can be variously changed.

Although the support part was constituted by the cover, the case and the ring member, it can also be constituted by (as) a single member. Furthermore, the shape and structure of the support part can be variously changed.

The discharge state of the cooling medium from the outlet part of the relief valve (the pressure control device) is not limited to the discharge amount, the discharge speed and the discharge trajectory of the embodiment described above.

Although a change of the discharge state of the cooling medium from the outlet part of the relief valve (the pressure control device) was determined by visual observation, it can also be determined by other methods. For example, a discharge state determining device can be used that is constituted by an imaging means that images the discharge state of the cooling medium from the outlet part of the relief valve (the pressure control device) and a determining means that determines a change of the discharge state of the cooling medium based on the image information outputted from the imaging means.

The mechanism that prevents rotation of the support part around the body part in the state in which the body part has been attached to the main shaft is not limited to the mechanism constituted by the fitting hole (the fitting part) that is provided on the machine tool side and the pin (the fitting member) that is provided on the support part and is capable of fitting in the fitting hole (the fitting part).

The mechanism that prevents rotation of the body part relative to the support part in the state in which the body part is not attached to the main shaft and allows rotation of the body part relative to the support part in the state in which the body part has been attached to the main shaft is not limited to the mechanism that is constituted by the engagement hole (the engagement part) provided in the body part and the rotation stopping member (the engaging member) that is provided on the support part and is capable of engaging in the engagement hole (the engagement part).

A variety of configurations of known pumps having a rotary part, an inlet part and an outlet part can be used as the pump.

A variety of methods can be used to connect the body part and the rotary part of the pump.

The shape and structure of the cap can be variously changed.

A variety of configurations of nozzles can be used as the nozzle.

A variety of configurations of known filters can be used as the filter. The filter can also be omitted.

It is sufficient that the support part can be fixed to the machine tool at least when the body part is attached to the main shaft of the machine tool and the rotary part of the pump is being rotated, and a variety of configurations of rotation stopping device can be used as the rotation stopping device. Furthermore, the rotation stopping device can be omitted if the rotary part of the pump can be rotated in conjunction with rotation of the main shaft in the state in which the body part has been attached to the main shaft of the machine tool.

A variety of methods can be used to prevent rotation of the support part.

The configuration of the cooling medium spray device is not limited to the configuration described in the embodiment.

Each of the features or structures described in the embodiment can be used individually or in combination of appropriately selected ones.

The cooling medium spray device of the present disclosure is preferably used with a machine tool having a tool magazine which is configured to house a plurality of tool holders, but it can also be used with machine tools having various other structures.

DESCRIPTION OF THE NUMERALS

10: machine tool, 20: main shaft of the machine tool, 20*a*: main shaft inside space, 21: main shaft inner peripheral surface, 21*a*: main shaft inner peripheral surface portion, 30: pulling-in member, 40: fixing part, 41: fitting hole (fitting part), 41*a*: wall surface, 100: cooling medium spray device, 110: body member, 111: body member passage, 112: shank part, 113: engagement hole (engagement part), 120: pull stud, 121: pull stud passage, 130: filter, 140: adapter (connecting member), 141: adapter passage (connecting member passage), 150: knock pin, 210: cover, 211: bearing, 212: hole, 212*a*: bottom surface, 220: case, 221: first case passage, 222: second case passage, 230: cap, 231: nozzle mounting hole, 232: cap passage, 240: nozzle, 241: nozzle passage, 242: spray hole, 250: ring member, 251: ring member passage, 300: pump, 301: inlet part, 302: outlet part, 400: anti-rotation device, 410: anti-rotation pin, 411: hole, 411*a*: bottom surface, 412: anti-rotation pin rear end surface, 420: spring (anti-rotation elastic force generating part), 430: anti-rotation lever, 431: nut, 500, 600: relief valve (pressure control device), 510, 610: relief valve body, 511, 611: relief valve passage (discharge passage), 511*a*, 611*a*: inlet part, 511*b*, 611*b*: outlet part, 512, 612: valve seat, 520, 620: steel ball (valve element), 530, 630: valve element support member, 540, 640: relief spring (pressure controlling elastic force generating part)

The invention claimed is:

1. A cooling medium spray device that increases a pressure of a cooling medium supplied from a main shaft of a machine tool and sprays the cooling medium, comprising:

a body part, a support part, a pump, a cap, a nozzle and a pressure control device, wherein:

the body part is removably attachable to the main shaft, and has a body part passage through which the cooling medium supplied from the main shaft passes in a state in which the body part has been attached to the main shaft, the support part has a support part interior space, in which the body part is rotatably disposed, a first passage and a second passage, the first passage communicating with the body part passage, the pump includes a rotary part, an inlet part and an outlet part, the rotary part being connected to the body part and rotatably disposed within the support part interior space of the support part, the inlet part communicates with the first passage of the support part, the outlet part communicates with the second passage of the support part, and the pump being configured such that, by rotating the rotary part, the pressure of the cooling medium that is being suctioned from the inlet part is increased to a pressure corresponding to the rotational speed of the rotary part such that pressurized cooling medium is discharged from the outlet part, the cap is disposed at a location of the support part that is on a first side of the pump in an axial direction so as to close the support part interior space of the support part, the cap having a cap passage that communicates with the second passage of the support part and a nozzle mounting hole that communicates with the cap passage, the nozzle is mounted in the nozzle mounting hole of the cap, and has a spray hole that discharges the cooling medium and a nozzle passage that communicates with the nozzle mounting hole, the pressure control device has a discharge passage, an inlet part, an outlet part, a valve seat and a valve element, the inlet part of the pressure control device being provided on an inflow side of the discharge passage so as to communicate with the second passage, the outlet part of the pressure control device being provided on an outflow side of the discharge passage, the valve seat being provided in the inlet part of the pressure control device, the valve element being configured to open and close the valve seat, and the pressure control device being configured such that, owing to the valve element opening and closing the valve seat based on the pressure of the cooling medium within the second passage and a pressure set value, the pressure of the cooling medium within the second passage is prevented from exceeding the pressure set value, the pump is configured such that when the rotational speed of the rotary part is a prescribed rotational speed, the pressure of the cooling medium that is being discharged from the outlet part of the pressure control device is a predetermined value that is higher than the pressure set value, and the outlet part of the pressure control device has a first sectional area and the inlet part of the pressure control device has a second sectional area that is larger than the first sectional area, so that, in a state in which the rotary part of the pump is rotating at the prescribed rotational speed, a change of a discharge state of the cooling medium from the outlet part is visually determinable.

2. The cooling medium spray device as defined in claim 1, wherein:

the pressure control device includes a first elastic force generating part that generates an elastic force, and the pressure control device is configured such that the elastic force generated by the first elastic force generating part acts as a force that moves the valve element in a direction of closing the valve seat, and the pressure of the cooling medium within the second passage acts as a force that moves the valve element in a direction of opening the valve seat.

3. The cooling medium spray device as defined in claim 1, wherein the pressure control device is configured such that the cooling medium is discharged from the outlet part of the pressure control device in a horizontal direction.

4. The cooling medium spray device as defined in claim 1, further comprising a rotation stopping device, wherein:

the rotation stopping device includes a pin that is provided on the support part and is fittable in a fitting part that is provided in the machine tool, and the rotation stopping device is configured such that, in the state in which the body part has been attached to the main shaft, the pin fits in the fitting part and prevents the support part from rotating around the body part.

5. The cooling medium spray device as defined in claim 4, wherein:

the body part is attachable to the main shaft by moving the body part toward a second side in the axial direction relative to the main shaft, the second side in the axial direction being opposite of the first side in the axial direction, the rotation stopping device further includes a second elastic force generating part, an engagement part and an engaging member, the pin is movable along the axial direction relative to the support part, the second elastic force generating part generates an elastic force that moves the pin relative to the support part toward the second side in the axial direction, the engagement part is provided on the body part, the engaging member is movable in the axial direction in conjunction with the pin and is engageable with the engagement part, and the cooling medium spray device is configured such that, in a state in which the body part is not attached to the main shaft, the pin moves toward the second side in the axial direction owing to the elastic force generated by the second elastic force generating part, the engaging member moves to an engagement position where it is engaged with the engagement part and rotation of the body part relative to the support part is prevented, and in the state in which the body part has been attached to the main shaft, the pin abuts on an abutment part provided on the machine tool and moves toward the first side in the axial direction against the elastic force generated by the second elastic force generating part and the engaging member moves to a disengagement position where engagement with the engagement part is released and rotation of the body part relative to the support part is possible.

6. The cooling medium spray device as defined in claim 2, wherein the pressure control device is configured to discharge the cooling medium from the outlet part of the pressure control device in a horizontal direction.

7. The cooling medium spray device as defined in claim 6, further comprising a rotation stopping device that includes a pin provided on the support part, the pin being configured to fit in a fitting part that is provided in the machine tool, and wherein the rotation stopping device is configured such that, in the state in which the body part has been attached to the main shaft, the pin is urged into the fitting part and thereby prevents the support part from rotating around the body part.

8. The cooling medium spray device as defined in claim 7, wherein:

the body part is attachable to the main shaft by moving the body part toward a second side in the axial direction relative to the main shaft, the second side in the axial direction being opposite of the first side in the axial direction, the rotation stopping device further includes a second elastic force generating part, an engagement part and an engaging member, the pin is movable along the axial direction relative to the support part, the second elastic force generating part generates an elastic force that moves the pin relative to the support part toward the second side in the axial direction, the engagement part is provided on the body part, and the engaging member is movable in the axial direction in conjunction with the pin and is engageable with the engagement part.

9. The cooling medium spray device as defined in claim 8, wherein the cooling medium spray device is configured such that:

in a state in which the body part is not attached to the main shaft, the elastic force generated by the second elastic force generating part urges the pin to move toward the second side in the axial direction such that the engaging member moves to an engagement position where it is engaged with the engagement part and rotation of the body part relative to the support part is prevented, and in the state in which the body part has been attached to the main shaft, the pin abuts on an abutment part provided on the machine tool and is thereby moved toward the first side in the axial direction against the elastic force generated by the second elastic force generating part such that the engaging member is moved to a disengagement position where engagement with the engagement part is released and rotation of the body part relative to the support part is possible.

10. The cooling medium spray device as defined in claim 9, wherein:

the pressure control device comprises a relief valve, the first elastic force generating part comprises a first spring, the second elastic force generating part comprises a second spring, the valve element is a ball, the fitting part defines a fitting hole in the machine tool, the engagement part defines an engagement hole provided in the body part, and the engaging member is a rotation stopping lever.

11. A cooling medium spray device configured to increase a pressure of a cooling medium supplied from a main shaft of a machine tool and to spray the cooling medium, comprising:

a body part configured to be removably attachable to the main shaft and having a body part passage through which the cooling medium supplied from the main shaft passes in a state in which the body part has been attached to the main shaft, a support part having a support part interior space, a first passage and a second passage, the first passage fluidly communicating with the body part passage, and the body part being rotatably disposed in the support part interior space, a pump including a rotary part that is connected to the body part and is also rotatably disposed in the support part interior space of the support part, an inlet port in fluid communication with the first passage of the support part, and an outlet port in fluid communication with the second passage of the support part, the pump being configured such that rotation of the rotary part causes the pressure of the cooling medium that is being suctioned from the inlet port to increase to a pressure corresponding to the rotational speed of the rotary part such that pressurized cooling medium is discharged from the outlet port, a cap disposed at a location on the support part that is on a first side of the pump in an axial direction so as to close the support part interior space of the support part, the cap having a cap passage in fluid communication with the second passage of the support part and having a nozzle mounting hole in fluid communication with the cap passage, a nozzle mounted in the nozzle mounting hole of the cap and having a spray hole configured to spray the pressurized cooling medium and a nozzle passage fluidly connecting the spray hole with the nozzle mounting hole, and a pressure control device having a discharge passage, an inlet port provided on an inflow side of the discharge passage so as to be in fluid communication with the second passage, an outlet port provided on an outflow side of the discharge passage, a valve seat defined in the inlet port of the pressure control device, and a valve element configured to open and close the valve seat, and the pressure control device being configured such that, movement of the valve element to open and close the valve seat based on the pressure of the pressurized cooling medium within the second passage and a pressure set value prevents the pressure of the pressurized cooling medium within the second passage from exceeding the pressure set value, wherein:

the pump is configured such that rotation of the rotary part at a prescribed rotational speed causes the pressure of the cooling medium that is being discharged from the output outlet port of the pressure control device to be a value that is higher than the pressure set value, the inlet port of the pressure control device has a first cross-sectional area, and the outlet port of the pressure control device has a second cross-sectional area that is smaller than the first cross-sectional area, such that in a state in which the rotary part of the pump is rotating at the prescribed rotational speed, a change of a discharge state of the cooling medium from the outlet port of the pressure control device is visually determinable.

12. The cooling medium spray device as defined in claim 11, wherein:

the pressure control device includes a first elastic force generating part that generates an elastic force, and the pressure control device is configured such that the elastic force generated by the first elastic force generating part urges the valve element to move in a direction of closing the valve seat, and the pressure of the pressurized cooling medium within the second passage urges the valve element to move in a direction of opening the valve seat.

13. The cooling medium spray device as defined in claim 11, wherein the pressure control device is configured to discharge the cooling medium from the outlet port of the pressure control device in a horizontal direction.

14. The cooling medium spray device as defined in claim 11, further comprising a rotation stopping device that includes a pin provided on the support part, the pin being configured to fit in a fitting part that is provided in the machine tool, wherein the rotation stopping device is configured such that, in the state in which the body part has been attached to the main shaft, the pin is urged into the fitting part and thereby prevents the support part from rotating relative to the body part.

15. The cooling medium spray device as defined in claim 14, wherein:

the body part is attachable to the main shaft by moving the body part toward a second side in the axial direction relative to the main shaft, the second side in the axial direction being opposite of the first side in the axial direction, the rotation stopping device further includes a second elastic force generating part, an engagement part and an engaging member, the pin is movable along the axial direction relative to the support part, the second elastic force generating part generates an elastic force that urges the pin to move relative to the support part toward the second side in the axial direction, the engagement part is provided in the body part, and the engaging member is movable in the axial direction in conjunction with the pin and is engageable in the engagement part.

16. The cooling medium spray device as defined in claim 15, wherein the cooling medium spray device is configured such that:

in a state in which the body part is not attached to the main shaft, the elastic force generated by the second elastic force generating part urges the pin to move toward the second side in the axial direction such that the engaging member moves to an engagement position where it is engaged with the engagement part and rotation of the body part relative to the support part is prevented, and in the state in which the body part has been attached to the main shaft, the pin abuts on an abutment part provided on the machine tool and is thereby moved toward the first side in the axial direction against the elastic force generated by the second elastic force generating part such that the engaging member is moved to a disengagement position where engagement with the engagement part is released and rotation of the body part relative to the support part is possible.

17. The cooling medium spray device as defined in claim 16, wherein:

the pressure control device comprises a relief valve, the second elastic force generating part comprises a spring, the valve element is a ball, the fitting part defines a fitting hole in the machine tool, the engagement part defines an engagement hole provided in the body part, and the engaging member is a rotation stopping lever.

18. The cooling medium spray device as defined in claim 12, wherein:

the pressure control device comprises a relief valve, the first elastic force generating part comprises a spring, and the valve element is a ball.

* * * * *